US010237621B2

(12) United States Patent
Sharma et al.

(10) Patent No.: US 10,237,621 B2
(45) Date of Patent: Mar. 19, 2019

(54) DIRECT CAPTURE AND SHARING OF SCREENSHOTS FROM VIDEO PROGRAMMING (71) Applicant: ECHOSTAR TECHNOLOGIES L.L.C., Englewood, CO (US)

(72) Inventors: Abhijit Sharma, Parker, CO (US); Michael Maldonado, Denver, CO (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

(21) Appl. No.: 15/080,097

(22) Filed: Mar. 24, 2016

(65) Prior Publication Data

US 2017/0280200 A1    Sep. 28, 2017

(51) Int. Cl.
H04N 5/445    (2011.01)
H04N 21/4788    (2011.01)
H04N 21/482    (2011.01)
H04N 21/41    (2011.01)
H04N 21/81    (2011.01)

(52) U.S. Cl.
CPC ..... *H04N 21/4788* (2013.01); *H04N 21/4104* (2013.01); *H04N 21/4126* (2013.01); *H04N 21/482* (2013.01); *H04N 21/8153* (2013.01)

(58) Field of Classification Search
CPC ............. H04N 21/433; H04N 21/4333; H04N 21/472; H04N 21/47205; H04N 21/4728; H04N 21/4788

See application file for complete search history.

(56) References Cited

U.S. PATENT DOCUMENTS

| 6,204,842 | B1 * | 3/2001 | Fujii | H04N 5/4401 |
| | | | | 348/E5.108 |
| 8,826,150 | B1 * | 9/2014 | Ainslie | H04L 65/403 |
| | | | | 715/753 |
| 2002/0046097 | A1 * | 4/2002 | Yoshimine | G06Q 20/10 |
| | | | | 705/14.23 |
| 2007/0022437 | A1 * | 1/2007 | Gerken | H04N 7/17318 |
| | | | | 725/41 |
| 2007/0041462 | A1 * | 2/2007 | Kim | H04N 1/00283 |
| | | | | 375/261 |
| 2007/0091194 | A1 * | 4/2007 | Kwak | H04N 5/23293 |
| | | | | 348/333.01 |

(Continued)

Primary Examiner — Pankaj Kumar
Assistant Examiner — Timothy R Newlin
(74) Attorney, Agent, or Firm — Lorenz & Kopf LLP (57) ABSTRACT A method of operating a video services receiver involves the processing of video data for presentation on a display element associated with the video services receiver. During presentation of the video event, a screenshot command is received at the video services receiver. The screenshot command originates from a remote control device assigned to the video services receiver. In response to receiving the screenshot command, a currently displayed image on the display element is captured as a saved screenshot. The method continues by providing a screenshot sharing user interface for presentation on the display element. The user interface includes at least one interactive control to facilitate sharing of the saved screenshot from the video services receiver. The method continues by outputting the saved screenshot from the video services receiver in association with a selected sharing application.

6 Claims, 5 Drawing Sheets

(56) References Cited

U.S. PATENT DOCUMENTS

| | | | |
|---|---|---|---|
| 2008/0016539 A1* | 1/2008 | Na | H04N 21/4122 725/105 |
| 2008/0109866 A1* | 5/2008 | Thomas | H04N 7/17318 725/139 |
| 2008/0139301 A1* | 6/2008 | Holthe | A63F 13/00 463/25 |
| 2009/0138906 A1* | 5/2009 | Eide | G06F 17/30038 725/32 |
| 2009/0245747 A1* | 10/2009 | Beyabani | H04N 17/004 386/241 |
| 2010/0123735 A1* | 5/2010 | Blanchard | H04N 5/44591 345/620 |
| 2012/0133727 A1* | 5/2012 | Bolduc | H04N 7/152 348/14.07 |
| 2012/0147269 A1* | 6/2012 | Cho | H04N 5/4448 348/552 |
| 2013/0083210 A1* | 4/2013 | Beckham | H04N 21/2743 348/207.11 |
| 2013/0260896 A1* | 10/2013 | Miura | A63F 13/12 463/42 |
| 2014/0002389 A1* | 1/2014 | Kim | G06F 3/1446 345/173 |
| 2014/0101565 A1* | 4/2014 | Mahieu | H04N 21/00 715/748 |
| 2014/0115454 A1* | 4/2014 | Li | G06F 17/212 715/273 |
| 2014/0354536 A1* | 12/2014 | Kim | G06F 3/017 345/156 |
| 2015/0016799 A1* | 1/2015 | Park | G06Q 10/10 386/224 |
| 2015/0039688 A1* | 2/2015 | Huang | H04L 65/403 709/204 |
| 2015/0256793 A1* | 9/2015 | Pycock | H04L 12/1813 348/14.07 |
| 2015/0312289 A1* | 10/2015 | Shen | H04W 4/21 709/204 |
| 2016/0182948 A1* | 6/2016 | Shang | H04N 1/00 725/41 |

* cited by examiner

DIRECT CAPTURE AND SHARING OF SCREENSHOTS FROM VIDEO PROGRAMMING

TECHNICAL FIELD

Embodiments of the subject matter described herein relate generally to video services receivers. More particularly, embodiments of the subject matter relate to certain operating methodologies that automatically capture, process, and share a screenshot during the presentation of a video program.

BACKGROUND

Most television viewers now receive their video signals through a content aggregator such as a cable or satellite television provider. Digital video broadcasting (DVB) systems, such as satellite systems, are generally known. A DVB system that delivers video service to a home will usually include a video services receiver, system, or device, which is commonly known as a set-top box (STB). In the typical instance, encoded television signals are sent via a cable or wireless data link to the viewer's home, where the signals are ultimately decoded in the STB. The decoded signals can then be viewed on a television or other appropriate display as desired by the viewer.

Digital content distribution, social media interaction, and content sharing have become routine aspects of daily life for millions of people. Smartphones and portable computing devices such as tablets enable users to quickly and easily capture and share digital images using social media and other platforms. In accordance with a typical sharing scenario, a user who is watching a television program at home (delivered by a broadcast video services provider via an STB or other piece of hardware) may want to send a message or create a social media post that relates to the program being watched. In such a scenario, the user can take a picture of the television screen or display element using, for example, a smartphone. After the picture of the displayed content is saved, the user can share the picture using an appropriate application or embedded function of the smartphone. Although this type of sharing is satisfactory, the user workflow can be cumbersome, time consuming, and complicated. Moreover, the quality of the shared image can suffer from artifacts, focusing issues, and/or otherwise poor quality.

Accordingly, it is desirable to have a quick, easy, and intuitive methodology for capturing and sharing a screenshot of a video program during the presentation of the program. Furthermore, other desirable features and characteristics will become apparent from the subsequent detailed description and the appended claims, taken in conjunction with the accompanying drawings and the foregoing technical field and background.

BRIEF SUMMARY

A method of operating a video services receiver is disclosed here. An exemplary embodiment of the method involves processing video data corresponding to a video event for presentation on a display element associated with the video services receiver. During presentation of the video event on the display element, a screenshot command is received at the video services receiver, the screenshot command originating from a remote control device assigned to the video services receiver. In response to receiving the screenshot command, a currently displayed image on the display element is captured as a saved screenshot. The method continues by providing a screenshot sharing user interface for presentation on the display element, the screenshot sharing user interface comprising at least one interactive control to facilitate sharing of the saved screenshot from the video services receiver. The the saved screenshot is output from the video services receiver in association with a selected sharing application.

Another method of operating a video services receiver is also disclosed. An exemplary embodiment of the method involves processing video data corresponding to a video event for presentation on a display element associated with the video services receiver. During presentation of the video event on the display element, a screenshot command is received at the video services receiver, the screenshot command originating from a remote control device assigned to the video services receiver. In response to receiving the screenshot command, the method captures a currently displayed image on the display element as a saved screenshot. The method continues by storing the saved screenshot in a nonvolatile storage element of the video services receiver for delayed processing with a sharing application.

A video services receiver is also disclosed here. An exemplary embodiment of the video services receiver includes a receiver interface to receive video data associated with a video event, a display interface for a display element operatively coupled to the video services receiver, the display interface facilitating presentation of the video event on the display element, and at least one processor coupled to the receiver interface and the display interface. The at least one processor is configurable to process the video data for presentation on the display element, receive a screenshot command that originates from a remote control device assigned to the video services receiver, execute the screenshot command to capture a currently displayed image on the display element as a saved screenshot, and initiate outputting of the saved screenshot from the video services receiver in association with a sharing application supported by the video services receiver.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, firmware, or other type of processor-executable instructions, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

The following description relates to a video delivery and presentation system that is suitably configured to process audio/visual content for presentation to a user. Although the following description focuses on video content conveyed in a video stream, the subject matter may also be utilized to handle still images provided as a slide show, or any type of visual content presented on a display element of a video services receiver.

The exemplary embodiments described below relate to a video delivery system such as a satellite television system, a cable delivery system, an Internet-based content delivery system, a cellular network delivery system, or the like. The disclosed subject matter relates to a system and related methodology for automatically capturing screenshots or short video clips from a video program as it is being presented on a display element, and for facilitating the sharing of the captured content using an appropriate application. The application can be a native application that resides at the video services receiver (e.g., the STB that provides the video content), or an online or web-based application that is accessible from the video services receiver using, for example, a native web browser. The sharing feature described herein allows a view to quickly and easily share a screenshot or video clip of while watching a video program, and with little to no interruption. The sharing application may be a social media application (such as the FACEBOOK application, the TWITTER application, or the INSTAGRAM application), an email application, a text messaging application, a cloud-based storage application (such as the DROPBOX application or the GOOGLE DRIVE application), or the like.

Figure 1:
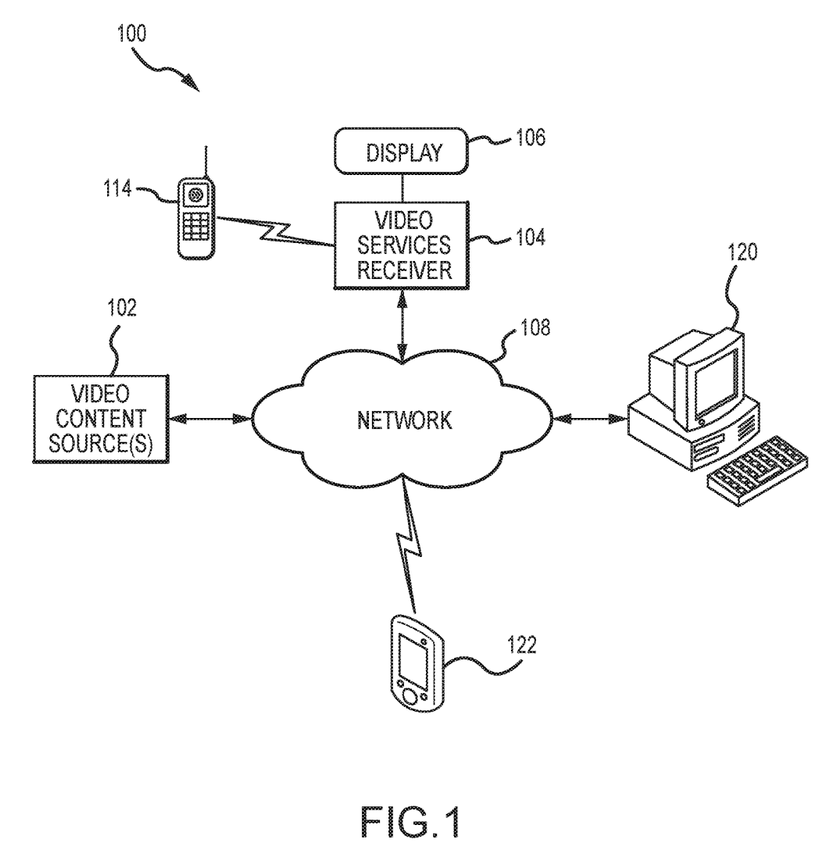
FIG. 1 is a block diagram that illustrates an exemplary embodiment of a video delivery system.

FIG. 1 is a block diagram that illustrates an exemplary embodiment of a video delivery system 100 that is suitably configured to support the techniques and methodologies described in more detail below. The system 100 (which has been simplified for purposes of illustration) generally includes, without limitation: at least one video content source 102 (referred to in the singular form herein for the sake of convenience); a video services receiver 104 or other form of customer equipment that is capable of receiving, processing, and rendering video content; and a display element 106 that is operatively coupled to, or otherwise associated with, the video services receiver 104. In certain embodiments, the video content source 102 communicates with the video services receiver 104 using a data communication network 108. For the sake of brevity, conventional techniques related to satellite, cable, and Internet-based communication systems, video broadcasting systems, data transmission, signaling, network control, and other functional aspects of the systems (and the individual operating components of the systems) may not be described in detail herein.

The data communication network 108 is any digital or other communications network capable of transmitting messages between senders (e.g., the video content source 102) and receivers (e.g., the video services receiver 104). In various embodiments, the network 108 includes any number of public or private data connections, links or networks supporting any number of communications protocols. The network 108 may include the Internet, for example, or any other network based upon TCP/IP or other conventional protocols. In various embodiments, the network 108 also incorporates a wireless and/or wired telephone network, such as a cellular communications network for communicating with mobile phones, personal digital assistants, and/or the like. The network 108 may also incorporate any sort of wireless or wired local area networks, such as one or more IEEE 802.3 and/or IEEE 802.11 networks.

The video content source 102 may be deployed as a head end facility and/or a satellite uplink facility for the system 100. In some embodiments, the video content source 102 may include or cooperate with one or more web-based content delivery applications, services, or providers. The video content source 102 generally functions to control content, signaling data, programming information, and other data sent to any number of receiving components. In practice, the video content source 102 also provides content and data that can be used to populate an interactive electronic program guide (EPG) generated by the video services receiver 104.

The video content source 102 includes one or more data processing systems or architectures that are capable of producing signals that are transmitted to customer premise equipment, mobile devices, computer systems, or the like. In various embodiments, the video content source 102 represents a satellite, cable, or other content distribution center having: a data control system for controlling content, signaling information, blackout information, programming information, and other data; and an control system for transmitting content, signaling information, blackout information, programming information, and other data using high-bandwidth links. These systems may be geographically, physically and/or logically arranged in any manner, with data control and uplink control being combined or separated as desired.

The video services receiver 104 can be realized as any device, system or logic capable of receiving signals from the video content source 102. Accordingly, the video services receiver 104 may include a receiver interface to receive data associated with video services, including any number of video events that are provided by various video providers. The video services receiver 104 is capable of providing demodulated content to a customer via the display element 106. Accordingly, the video services receiver 104 may include a suitable display interface for the display element 106, where the display interface facilitates presentation of video and image content (including video events and related programming), graphical user interfaces, notifications, and other visuals on the display element 106. As explained in more detail below, the video services receiver 104 may also be configured to support certain video screenshot sharing functions. In certain exemplary embodiments, the video services receiver 104 is a piece of hardware that is intended for deployment in the customer premises (rather than as a portable or mobile electronic device that is carried by the user). Moreover, for the implementation described herein, the video services receiver 104 and the related display element 106 are physically distinct and separate pieces of hardware. In many practical embodiments, the video services receiver 104 can be realized as an STB that functions as an intermediary between the video content source 102 and the display element 106. Accordingly, the video services receiver 104 can be linked to, registered with, or otherwise associated with a remote control device 114 that is suitably configured to wirelessly control the operation of the video services receiver 104 using any number of standard, customizable, and/or special purpose control buttons, touchscreen elements, or the like.

The display element 106 may be realized as any of the following, without limitation: a television set; a monitor; a computer display; or any suitable customer appliance with compatible display capabilities. As mentioned above, the video services receiver 104 is preferably implemented as an STB as commonly used with digital video broadcasting, satellite, or cable television distribution systems. In other embodiments, however, the functionality of the video services receiver 104 may be commonly housed within the display element 106 itself. In still other embodiments, the video services receiver 104 is a portable device that may be transportable with or without the display element 106. The video services receiver 104 may also be suitably configured to support broadcast television reception, video game playing, personal video recording and/or other features as desired.

During typical operation, the video services receiver 104 receives programming (broadcast events, on-demand video events, emergency broadcasts, etc.), signaling information, and/or other data via the network 108. The video services receiver 104 then demodulates, decompresses, descrambles, and/or otherwise processes the received digital data, and then converts the received data to suitably formatted video signals that can be rendered for viewing by the customer on the display element 106. The video services receiver 104 may also be capable of receiving web-based content via the network 108, the Internet, etc., and may also be capable of recording and playing back video content. Moreover, the video services receiver 104 can include recording and storage functionality, such as integrated digital video recorder (DVR) functionality.

The video services receiver 104 can be operated in a traditional manner to receive, decode, and present a current video stream for presentation to a user (i.e., content provided by a given video service or channel). Moreover, the video services receiver 104 can be operated to present a video event in an ongoing manner while capturing, processing, and sharing a screenshot or a video clip of the video event. In certain implementations, the video services receiver 104 includes multiple tuners to enable it to concurrently receive and process one video stream for rendering and presentation while receiving and processing one or more additional video streams in the background if needed.

Although not separately depicted in FIG. 1, the video services receiver 104, the video content source 102, and/or another component in the system 100 may include video place-shifting functionality, or it may cooperate with a suitably configured place-shifting device or component to place-shift video content. In this regard, it may be possible to provide live or recorded content to a remote device operated by the user, wherein the video services receiver 104, the video content source 102, and/or another component in the system 100 serves as a source of the place-shifted content.

Although not required, the system 100 may support additional devices that enable the viewer to share captured screenshots or video clips, using the video services receiver 104 as a sharing platform. In this regard, the video services receiver 104 can communicate with any suitably configured computing device 120, mobile device 122, or other network-enabled electronic device that has data connectivity with the network 108. The computing device 120 may be realized using any compatible platform, including, without limitation: a desktop computer; a laptop computer; a tablet computer; a smart television device; a video game console; or any suitably configured piece of electronic equipment. The mobile device 122 may be realized using any compatible platform, including, without limitation: a smartphone; a digital media player; a handheld navigation device; a portable medical device; a smart wristwatch or other wearable computing device; or the like.

Figure 2:
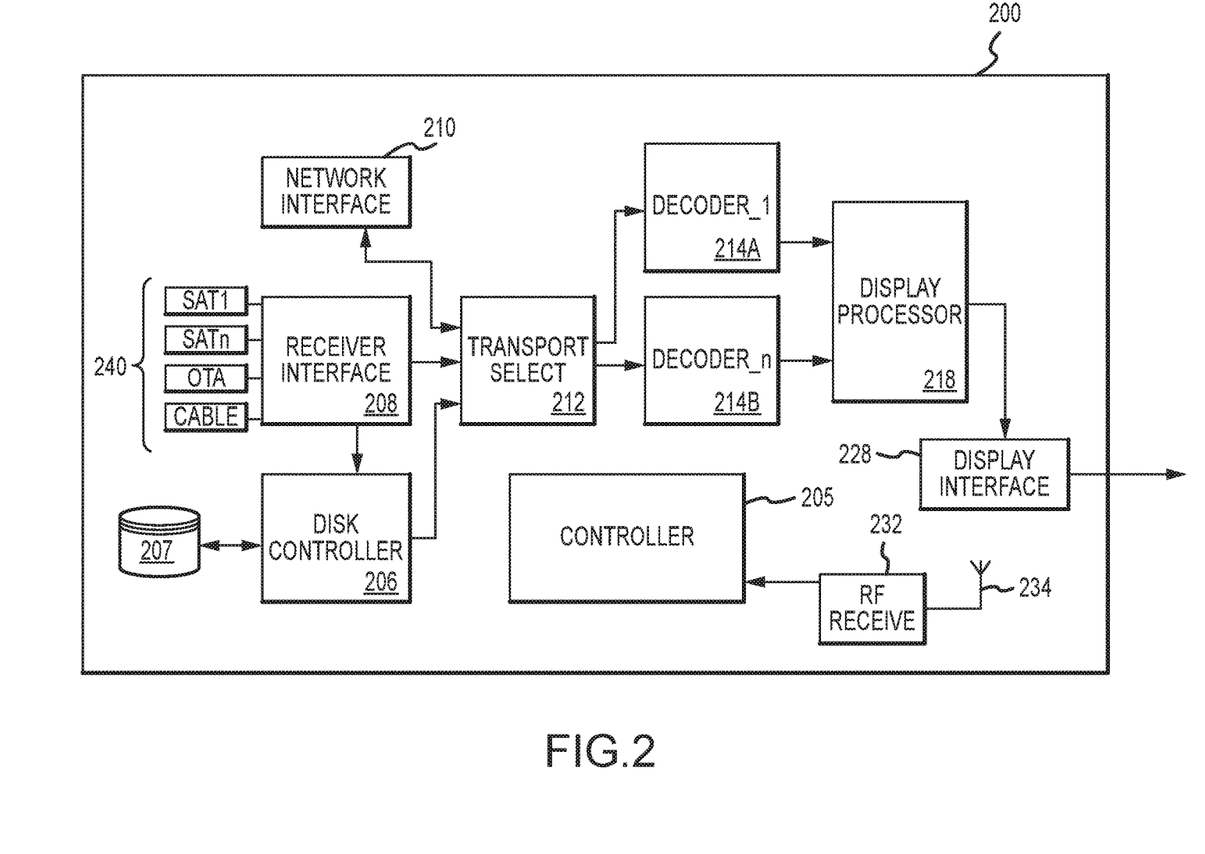
FIG. 2 is a simplified schematic representation of an embodiment of a video services receiver suitable for use in the system shown in FIG. 1.

Although a variety of implementations are contemplated by this disclosure, the following example assumes that the video services receiver 104 is realized as a set-top box that is intended for deployment at a customer premises, e.g., the user's home, an office, a place of business, a school, or the like. In this regard, FIG. 2 is a simplified schematic representation of an embodiment of a video services receiver 200 suitable for use in the system shown in FIG. 1. The illustrated video services receiver 200 may represent one suitable embodiment of the video services receiver 104 shown in FIG. 1. This particular embodiment generally includes, without limitation: a receiver interface 208, a plurality of decoder modules 214, and a display processor module 218, as appropriate. FIG. 2 also shows a disk controller interface 206 to a disk or other storage device 207, a network interface 210 to a local or wide area network, a transport select module 212, a display interface 228 for the display element 106, an RF receiver module 232, and a controller 205, which may be implemented as control logic executed by a processor architecture having at least one processor device. Other embodiments may incorporate additional or alternate processing modules from those shown in FIG. 2, may omit one or more modules shown in FIG. 2, and/or may differently organize the various modules in any other manner different from the exemplary arrangement shown in FIG. 2.

The video services receiver 200 may be physically and logically implemented in any manner. FIG. 2 shows various logical and functional features that may be present in an exemplary device, wherein each module shown in the figure may be implemented with any sort of hardware, software, firmware, and/or the like. In this regard, the video services receiver 200 may include a processor architecture having at least one processor device that cooperates with other modules, elements, and devices of the video services receiver 200 to support the features and functions described herein. Any of the various processing modules may be implemented with any sort of general or special purpose integrated circuitry, for example, any sort of microprocessor, microcontroller, digital signal processor, programmed array and/or the like. Any number of the modules shown in FIG. 2, for example, may be implemented as a "system on a chip" (SoC) using any suitable processing circuitry under control of the controller 205. In various embodiments, the control logic of the controller 205 executes within an integrated SoC or other processor that implements the receiver interface 208, the transport select module 212, the decoder module 214, the display processor module 218, the disk controller interface 206, and/or other features, as appropriate. In still other embodiments, various distinct chips, circuits or components may be interconnected with each other to implement the receiving and decoding functions represented in FIG. 2.

Various embodiments of the video services receiver 200 therefore include any number of appropriate modules for obtaining and processing media content (which may include video content, audio content, audiovisual content, still images, graphics, advertisements, posters or screens related to program events, or the like) as desired for the particular embodiment. Each of these modules may be implemented in any combination of hardware and/or software using logic executed within any number of semiconductor chips or other processing logic.

Various embodiments of the controller 205 can include any circuitry, components, hardware, software and/or firmware logic capable of controlling the various components of the video services receiver 200. Various routines, methods and processes executed within the video services receiver 200 are typically carried out under the instruction of the controller 205, as described more fully below. Generally speaking, the controller 205 receives user input signals via the RF receiver module 232, which in turn communicates with the remote control device 114 (see FIG. 1) using a suitable antenna 234. The controller 205 receives user inputs from the remote control device 114 and/or any other source, and directs the other components of the video services receiver 200 in response to the received inputs to present the desired imagery on a display element.

As noted above, many embodiments of the video services receiver 200 include a receiver interface 208, which is any hardware, software, firmware and/or other logic capable of receiving data associated with video services (e.g., media content data) via one or more content sources 240. In various embodiments, the content sources 240 may include any number of cable television, DBS, broadcast and/or other programming sources as appropriate. Although not separately depicted in FIG. 2, the receiver interface 208 may include or cooperate with a plurality of tuners that are configured to receive the content data from the content sources 240. For example, in a satellite video system, the receiver interface 208 may include a plurality of tuners to enable the video services receiver 200 to receive data from a plurality of satellite transponders.

The receiver interface 208 appropriately selects a desired input source and provides the received content to an appropriate destination for further processing. In various embodiments, received programming may be provided in real-time (or near real-time) to a transport select module 212 or other component for immediate decoding and presentation to the user. Alternatively, the receiver interface 208 may provide content received from any source to a disk or other storage medium in embodiments that provide DVR functionality. In such embodiments, the video services receiver 200 may also include a disk controller interface 206 that interacts with an internal or external hard disk, memory and/or other storage device 207, which may be suitably configured to store recorded video content in an appropriate database structure. The storage device 207 can be realized as a nonvolatile storage element to store captured screenshots and/or captured video clips for delayed outputting with a sharing application, as described in more detail below.

In the embodiment shown in FIG. 2, the video services receiver 200 also includes an appropriate network interface 210, which operates using any implementation of protocols or other features to support communication by the video services receiver 200 on a network. In various embodiments, the network interface 210 supports conventional LAN, WAN or other protocols (e.g., the TCP/IP or UDP/IP suite of protocols widely used on the Internet) to allow the video services receiver 200 to communicate on the Internet or any other network as desired. The network interface 210 typically interfaces with the network using any sort of LAN adapter hardware, such as a conventional network interface card (NIC) or the like provided within the video services receiver 200. In certain embodiments, the network interface 210 enables the video services receiver 200 to share captured video content using native sharing applications. Additionally or alternatively, the network interface 210 enables the video services receiver 200 to access hosted online sharing applications (using, for example, native web browser functionality) for purposes of sharing captured video content.

The transport select module 212 is any hardware and/or software logic capable of selecting a desired media stream from the available sources. In the embodiment shown in FIG. 2, the transport select module 212 is able to generate video signals for presentation on one or more output display interfaces 228. Typically, the transport select module 212 responds to viewer inputs (e.g., via the controller 205) to simply switch encoded content received from a broadcast, satellite, cable or other content source 240 or from the storage device 207 to one or more decoder modules 214.

The video services receiver 200 may include a plurality of decoder modules 214 for decoding, decompressing, and/or otherwise processing received/stored content as desired. Generally speaking, the decoder modules 214 decompress, decode, and/or otherwise process received content from the transport select module 212 to extract an MPEG or other media stream encoded within the stream. The decoded content can then be processed by one or more display processor modules 218 to create a presentation on a display element for the viewer in any appropriate format. FIG. 2 shows two decoder modules 214A, 214B operating on two separate signals from the transport select module 212. The two decoder modules 214A, 214B allow the video services receiver 200 to provide and present two distinct and separate video streams concurrently on one display element. In practice, any number of decoder modules 214 may be used, particularly in situations where multiple signals are simultaneously decoded and displayed. Accordingly, the term "decoder" may collectively apply to one or more decoder modules that are able to decode one or more signals for presentation on the display element.

The display processor module 218 includes any appropriate hardware, software and/or other logic to create desired screen displays via the display interface 228 as desired. Such displays may include combining signals received from one or more of the decoder modules 214 to facilitate presentation and viewing of one or more channels of video content on the display element 106. In various embodiments, the display processor module 218 is also able to produce on screen displays (OSDs) for an interactive EPG, setup and control functions, input/output facilitation, and/or other features that may vary from embodiment to embodiment. Such graphical displays are not typically contained within the received or stored broadcast stream, but are nevertheless useful to users in interacting with the video services receiver 200. The generated displays, including received/stored content and any other displays may then be presented to one or more output display interfaces 228 in any desired format.

The display processor module 218 produces an output signal encoded in any standard format (e.g., ITU656 format for standard definition television signals or any format for high definition television signals) that can be readily converted to standard and/or high definition television signals at the display interface 228. In other embodiments, the functionality of the display processor module 218 and the display interface 228 may be combined in any manner.

Figure 3:
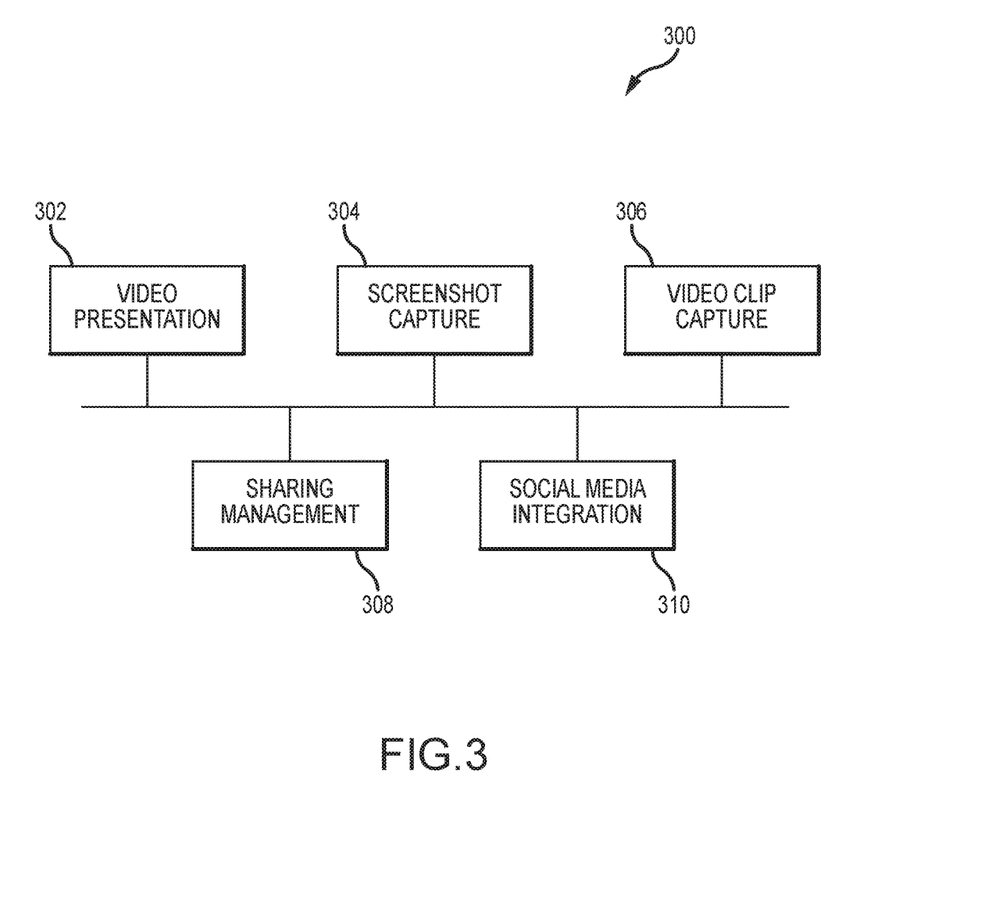
FIG. 3 is another simplified schematic representation of an embodiment of a video services receiver suitable for use in the system shown in FIG. 1.

FIG. 3 is another simplified schematic representation of an embodiment of a video services receiver 300 suitable for use in the system shown in FIG. 1. FIG. 3 depicts various features or functions of the video services receiver 300 as cooperating blocks, for ease of description. It should be appreciated that the illustrated video services receiver 300 may represent one suitable embodiment of the video services receiver 104 shown in FIG. 1 and the video services receiver 200 shown in FIG. 2. This particular embodiment generally includes, without limitation: video presentation functionality 302; screenshot capture functionality 304; video clip capture functionality 306; sharing management functionality 308; and social media integration functionality 310.

The video presentation functionality 302 relates to the primary mode of operation supported by the video services receiver 300, namely, the processing and rendering of video content for viewing by the user. The video presentation functionality 302 results in the presentation of a video event on the display element 106, wherein the video event can be a broadcast program event received by the video services receiver 300 or a recorded program event stored or accessed by the video services receiver 300.

The screenshot capture functionality 304 represents the hardware, software, firmware, processing logic, and control logic associated with the capturing, saving, and processing of still images captured from a video event being presented by the video services receiver 300. Similarly, the video clip capture functionality 306 represents the hardware, software, firmware, processing logic, and control logic associated with the capturing, saving, and processing of video clips or short segments captured from a video event being presented by the video services receiver 300. The screenshot capture functionality 304 and the video clip capture functionality 306 can be controlled at least in part by a user of the video services receiver 300 using, for example, the remote control device 114 (shown in FIG. 1).

The sharing management functionality 308 represents the techniques, methodologies, and processes related to launching, controlling, and interacting with at least one sharing application, which may be a native application resident at the video services receiver 300 or a hosted online application that can be accessed by the video services receiver 300. The sharing management functionality 308 is also responsible for supporting certain routines, user workflows, and processes that support or otherwise enable the processing of captured screenshots and video clips for purposes of sharing. For example, the sharing management functionality 308 may be responsible for formatting or creating image files (e.g., in JPEG format) or video files (e.g., in MPEG format) suitable for sharing, and for the generation and rendering of interactive graphical user interface elements that are specific to the sharing functionality described herein.

The social media integration functionality 310 represents the techniques, methodologies, and processes related to cooperation with social media platforms, systems, and/or applications. In this regard, the cooperating social media platforms may be provided, maintained, and supported by third party entities (i.e., entities other than the video service provider). For example, the social media integration functionality 310 enables the video services receiver 300 to communicate with (and post screenshot content to) popular social media platforms such as the FACEBOOK platform, the TWITTER platform, and the INSTAGRAM platform. Moreover, the social media integration functionality 310 may include or cooperate with native web browser functionality to access and interact with hosted web-based social media applications if so desired.

Figure 4:
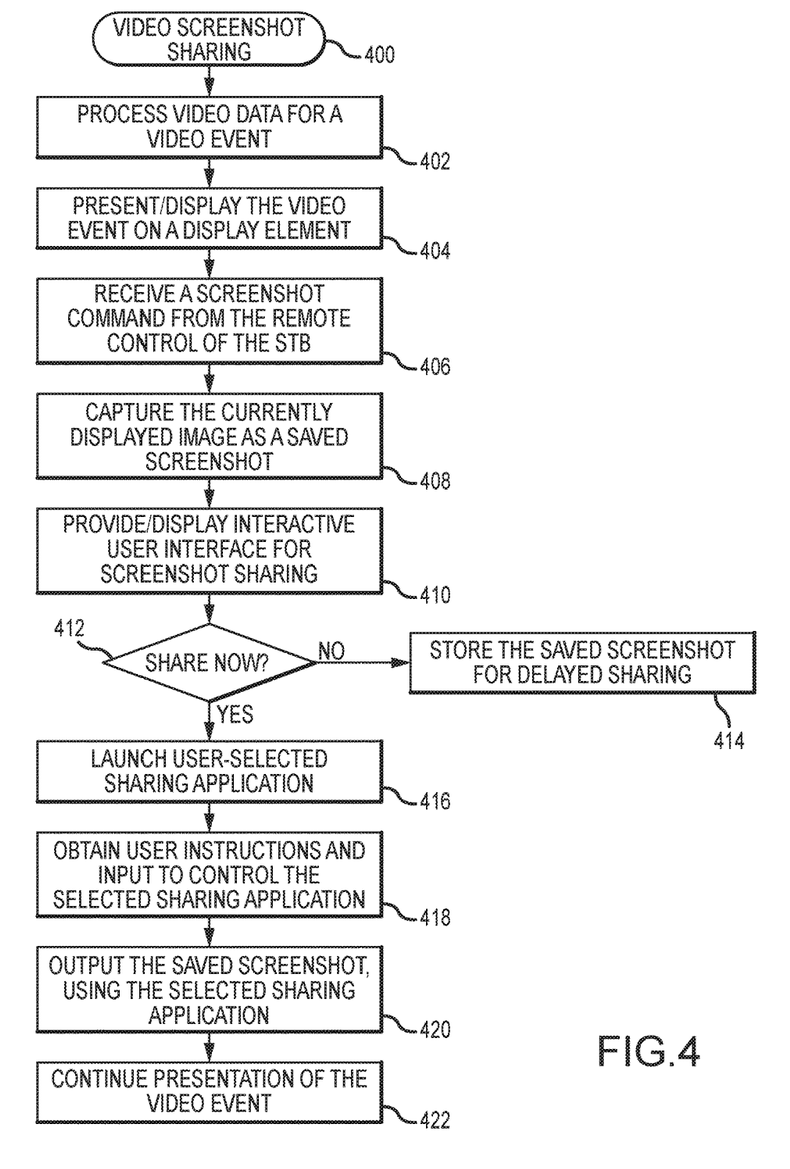
FIG. 4 is a flow chart that illustrates an exemplary embodiment of a video screenshot sharing process.

FIG. 4 is a flow chart that illustrates an exemplary embodiment of a video screenshot sharing process 400, which can be performed by a video services receiver of the type described above. The various tasks performed in connection with the process 400 may be performed by software, hardware, firmware, or any combination thereof. For illustrative purposes, the following description of the process 400 may refer to elements mentioned above in connection with FIGS. 1-3. It should be appreciated that the process 400 may include any number of additional or alternative tasks, and that the tasks shown in FIG. 4 need not be performed in the illustrated order. In certain embodiments, the process 400 can be incorporated into a more comprehensive procedure or process having additional functionality not described in detail herein. Moreover, one or more of the tasks shown in FIG. 4 could be omitted from an embodiment of the process 400 as long as the intended overall functionality remains intact.

For this example, the video services receiver processes a stream of video data that corresponds to a video event or program (task 402). The video data can be received by the video services receiver for a "live" broadcast event, or it can be retrieved from a storage element for a recorded event. Task 402 involves the processing of the video data for presentation on the display element that is coupled to or is otherwise associated with the video services receiver. In this context, the video services receiver can leverage conventional video decoding, formatting, rendering, and displaying technologies as needed to present (display) the video event on the display element (task 404) in an ongoing manner for viewing by one or more users.

During the presentation of the video event on the display element, the process 400 checks whether the video services receiver has obtained a screenshot command from a compatible device or system (such as the remote control device 114, a user's smartphone, a tablet computer, or the like). This example assumes that the process 400 receives a screenshot command originating from the remote control device 114 of the host video services receiver (task 406). Notably, the screenshot command is issued and received during presentation of the video event. In certain non-limiting embodiments, the remote control device 114 includes one or more buttons that are devoted to the screenshot sharing feature. For example, the remote control device 144 can include a special "SCREENSHOT" button (or a programmable button that is assigned to function as a "SCREENSHOT" button) that, when activated by the user, initiates the screenshot capture procedure by issuing the screenshot command. Alternatively or additionally, the remote control device 144 can include a devoted or assignable "VIDEO CLIP" button that, when activated by the user, initiates a video clip capture procedure by issuing the screenshot command.

In response to receiving the screenshot command, the video services receiver executes the command to capture the currently displayed image as it appears on the display element (task 408). It should be appreciated that the actual image that is captured (or the beginning of a captured video clip) will be substantially concurrent with the currently displayed image, due to practical transmission and processing delays. For example, task 408 may capture an image that occurs one or more video frames after the moment when the user activated the SCREENSHOT button. The captured screenshot can be temporarily stored as a saved screenshot in nonvolatile or volatile memory if so desired.

The video services receiver is suitably configured to retrieve or access the appropriate video data that corresponds to the desired screenshot to be captured. For example, the video services receiver can obtain and process the data for a given video frame and perform any number of conversion, reformatting, image processing, encoding, or compression processes to create the saved screenshot. The saved screenshot can be saved in one or more file formats including, without limitation: JPEG; EXIF; TIFF; BMP; GIF; and PNG formats. Task 408 can capture and generate the saved screenshot in any desired resolution or size, or in multiple versions if so desired.

Depending on the particular embodiment, user preferences, or the configuration of the video services receiver, the process 400 can: automatically pause the presentation of the video event in response to receiving the screenshot command; continue presentation of the video event as usual; or continue "presentation" of the video event in the background while changing focus to accommodate the screenshot sharing feature. This example assumes that presentation of the video event continues during the capturing of the currently displayed image and during the subsequent processing of the captured screenshot, such that the programming is not interrupted.

Figure 5:
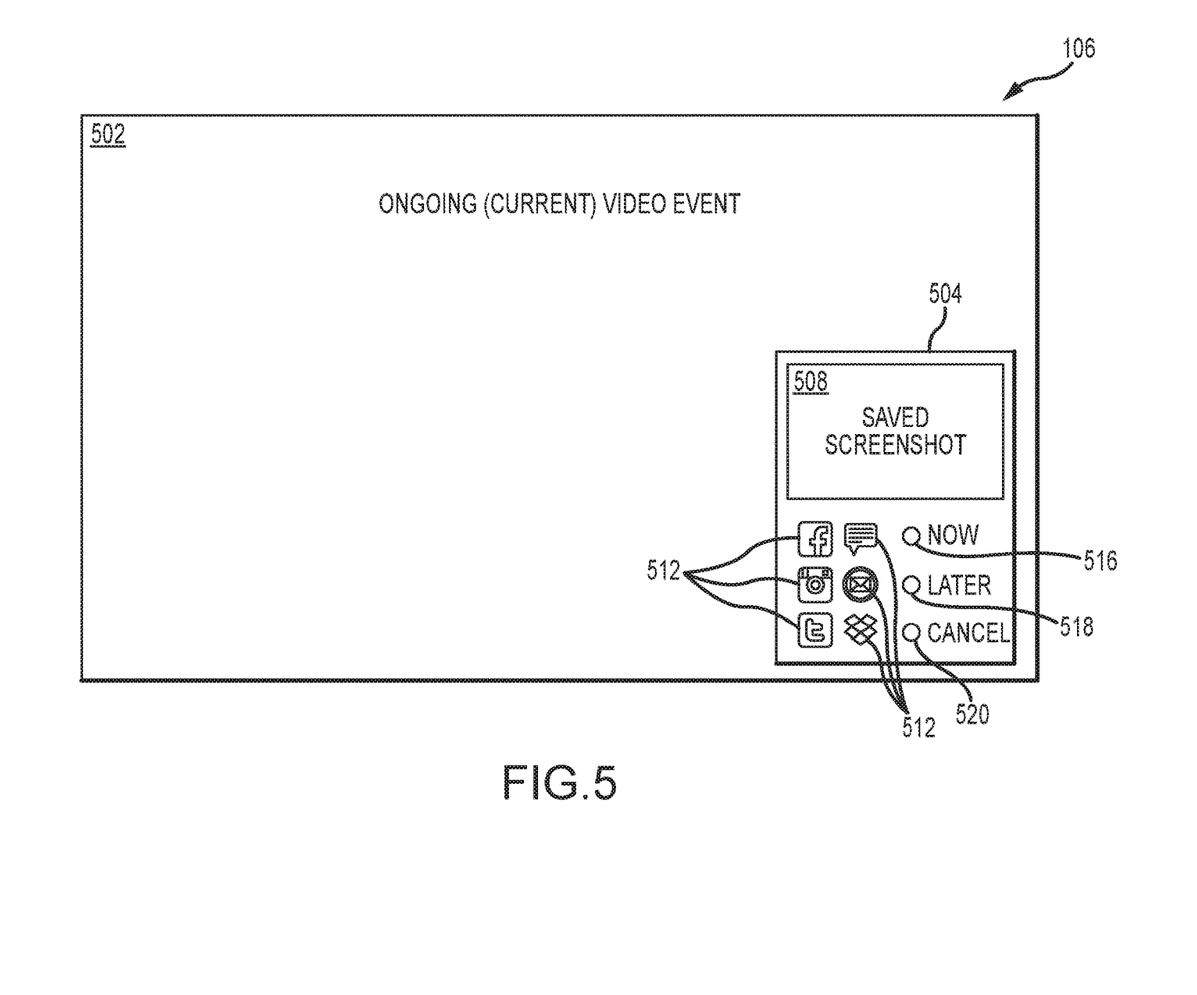
FIG. 5 is a schematic representation of a display element having video content and a screenshot sharing user interface rendered thereon.

In response to receiving the screenshot command and/or in response to capturing the screenshot, the process 400 generates and provides a screenshot sharing user interface for presentation on the display element 106 (task 410). The screenshot sharing user interface can be displayed alongside the ongoing video event in a separate window, it can be displayed as a pop-up window or in a picture-in-picture window, it can be displayed overlying a section of the video event, or the like. This example assumes that the screenshot sharing user interface is provided in a distinct window or area of the display element 106 that overlaps a portion of the ongoing video event. In this regard, FIG. 5 is a schematic representation of the display element 106 at a time during which a video event 502 and a screenshot sharing user interface 504 are rendered thereon. As depicted in FIG. 5, the screenshot sharing user interface 504 is provided for presentation overlying at least a portion of the ongoing video event 502. The shape, size, configuration, and location of the screenshot sharing user interface 504 are merely indicative of one exemplary embodiment, and the example shown in FIG. 5 is not intended to limit or otherwise restrict the scope of the subject matter described here. Moreover, the content, functionality, and arrangement of elements in the screenshot sharing user interface 504 are consistent with certain exemplary embodiments. In practice, the screenshot sharing user interface 504 may vary from that depicted in FIG. 5.

The exemplary embodiment of the screenshot sharing user interface 504 generally includes, without limitation, a thumbnail image 508 or other copy of the saved screenshot, and at least one interactive control to facilitate sharing of the saved screenshot from the video services receiver. The at least one interactive control includes a respective icon 512 for each selectable sharing application that is available for sharing the saved screenshot. For this particular example, the screenshot sharing user interface 504 supports the following sharing applications: the FACEBOOK application; the INSTAGRAM application; the TWITTER application; a text messaging application; an email application; and the DROPBOX application. The number of types of icons 512 rendered with the screenshot sharing user interface 504 can vary from one embodiment to another, and can vary depending on user preferences and application configurations, and the like.

The at least one interactive control may also include selectable buttons that indicate options, preferences, or instructions. For example, the screenshot sharing user interface 504 includes a selectable element 516 labeled "Now", another selectable element 518 labeled "Later", and yet another selectable element 520 labeled "Cancel". When highlighted or activated, the selectable element 516 causes the saved screenshot to be shared immediately. Immediate sharing in this manner assumes that at least one of the application icons 512 has already been selected (or will be selected next), wherein the sharing application corresponding to the selected icon 512 is the intended share destination or sharing vehicle. In contrast, selection of the selectable element 518 initiates storing of the saved screenshot in a nonvolatile storage element of the video services receiver for delayed outputting with one or more sharing applications. Delayed sharing in this manner can be performed in association with a sharing application selected at the present time (e.g., the user also selects one of the interactive icons 512 in conjunction with selecting the "Later" option). Alternatively or additionally, one or more sharing applications can be designated at the time when the user decides to actually share out the captured screenshot. Selection of the "Cancel" selectable element 520 closes the screenshot sharing user interface 504 without sharing the screenshot and without scheduling a delayed share. In certain embodiments, selection of the "Cancel" option also results in the deletion of the saved screenshot.

Referring again to FIG. 4 and the process 400, the screenshot sharing user interface 504 can be provided with the ongoing video event 502 for a limited period of time (i.e., until a timeout has been reached), or until the user makes an appropriate selection. The process 400 contemplates two of the possible options mentioned above: sharing the screenshot now or later. If the user decides to share the screenshot later (the "No" branch of query task 412), then the process 400 continues by storing the saved screenshot in a storage element (preferably nonvolatile storage) of the video services receiver. Storing the screenshot in this way allows the user to quickly return to the video event while delaying the sharing procedure until a more convenient time.

This example assumes that the user has selected one of the application icons 512 and has also chosen to immediately share the saved screenshot (the "Yes" branch of query task 412). In response to such user activity, the process 400 launches or accesses the sharing application (task 416) that is linked to the user-selected icon 512. In certain scenarios, the selected sharing application is native to the video services receiver and, therefore, task 416 involves the launching or focusing of the selected sharing application, which is resident at the video services receiver. In other scenarios, the selected sharing application is a hosted online application and, therefore, task 416 may involve the launching or activation of a web browser application resident at the video services receiver and directing the web browser to a URL or address corresponding to the hosted sharing application. Regardless of the operating scenario, task 416 results in a transition to the selected sharing application. The transition may cause changes in the appearance, format, and configuration of the screenshot sharing user interface 504, or it may close the screenshot sharing user interface in favor of a new window generated by the selected sharing application. For example, the display element 106 may be controlled to display any of the following, without limitation: a feed or home page of the user's social media account; a picture sharing form; an email with the screenshot as an attachment or an embedded image; a text message with the screenshot as an attachment or an embedded image; or the like.

The selected sharing application and/or other native functionality of the video services receiver can be manipulated to obtain user instructions and/or user input to control the content to be shared, to identify the recipients of the share (if applicable), and to otherwise control the features and functions of the sharing application (task 418). In this regard, task 418 may require the user to enter text on a compatible keyboard, to use a touchscreen (which may be implemented with the display element 106), and/or to use the remote control device 114 to traverse a rendering of a keyboard displayed on the display element 106. The sharing application may also allow the user to modify certain characteristics or parameters of the shared screenshot, such as the size or resolution, a compression level, and the like. Moreover, the sharing application may allow the user to edit the visual characteristics of the screenshot before sharing it (e.g., applying a filter, cropping, adjusting color, changing brightness, adjusting contrast, or the like).

Eventually, the saved screenshot is output or sent using the selected sharing application (task 420). If the sharing application is native to the video services receiver, then the screenshot is output from the video services receiver in association with the operation of the sharing application. After completion of the sharing routine, the screenshot sharing user interface 504 (if still active) and/or the sharing application window are closed to facilitate continued presentation of the ongoing video event 502 (task 422). For this particular example, presentation of the video event continues during the capturing of the screenshot, while the screenshot sharing user interface is displayed, and during the sharing or outputting of the saved screenshot. In alternative scenarios, completion of the screenshot sharing routine can automatically resume the paused playback of the video event.

The sharing features have been described with reference to an exemplary embodiment that handles screenshots (still images). It should be appreciated that the fundamental concepts, techniques, and technologies described herein can be extended to handle the capturing and sharing of short video segments if so desired. For example, it may be desirable to capture a brief five or ten second long video clip from the ongoing video event, and to share the captured clip via a sharing application. Accordingly, the various techniques, methodologies, and approaches mentioned above in the context of screenshot sharing can also be leveraged to capture and share video clips.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a video services system having a set-top box receiver and a display element coupled to the set-top box receiver, the set-top box receiver controllable by a remote control device assigned thereto, the remote control device having both a devoted screenshot button and a devoted video clip button, the method comprising:

processing video data corresponding to a video event for presentation on the display element;

during presentation of the video event on the display element, wirelessly receiving a screenshot command at the set-top box receiver, the screenshot command originating from activation of one of the screenshot button or the video clip button of the remote control device assigned to the set-top box receiver, the remote control device configured to wirelessly control operation of the set-top box receiver;

in response to receiving the screenshot command, capturing either a currently displayed image on the display element as a saved screenshot when the screenshot command originates from activation of the screenshot button of the remote control device, or a video clip of the video event as a saved video segment when the screenshot command originates from activation of the video clip button of the remote control device;

providing a screenshot sharing user interface for presentation on the display element concurrently with presentation of the video event on the display element, the screenshot sharing user interface provided in a distinct and separate window or area of the display element, the screenshot sharing user interface comprising an interactive control comprising a user activatable icon for a hosted online sharing application, wherein user selection of the icon initiates sharing of the saved screenshot or the saved video segment from the set-top box receiver by way of the hosted online sharing application;

in response to user activation of the icon, launching a web browser application resident at the set-top box receiver and directing the web browser to an address corresponding to the hosted online sharing application, resulting in a transition from the screenshot sharing user interface provided on the display element to a window generated by the hosted online sharing application and provided on the display element;

obtaining, at the set-top box receiver, user instructions to manipulate and control functions of the hosted online sharing application to control the outputting of the saved screenshot or the saved video segment using the hosted online sharing application; and outputting the saved screenshot or the saved video segment from the set-top box receiver in association with the hosted online sharing application;

wherein presentation of the video event continues throughout the capturing of the currently displayed image or the video clip, the providing of the screenshot sharing user interface, and the outputting of the saved screenshot or the saved video segment.

2. The method of claim 1, wherein the screenshot sharing user interface is provided for presentation overlying at least a portion of the video event presented on the display element.

3. The method of claim 1, wherein the screenshot sharing user interface is provided with a copy of the saved screenshot.

4. The method of claim 1, further comprising:
storing the saved screenshot in a nonvolatile storage element of the set-top box receiver for delayed outputting.

5. The method of claim 1, wherein the interactive control of the screenshot sharing user interface comprises a plurality of selectable icons corresponding to a plurality of different hosted online sharing applications that are available for sharing the saved screenshot or the saved video segment.

6. A video services system comprising:
a display element;
a set-top box receiver operatively coupled to control the display element; and
a remote control device assigned to the set-top box receiver and configured to wirelessly control operation of the set-top box receiver, the remote control device having both a devoted screenshot button and a devoted video clip button;
wherein the set-top box receiver comprises:
a receiver interface to receive video data associated with a video event;
a display interface for the display element, the display interface facilitating presentation of the video event on the display element; and
at least one processor coupled to the receiver interface and the display interface, wherein the at least one processor is configurable to process the video data for presentation on the display element, receive a screenshot command that originates from activation of one of the screenshot button or the video clip button of the remote control device, execute the screenshot command to capture a currently displayed image on the display element as a saved screenshot when the screenshot command originates from activation of the screenshot button of the remote control device, or to capture a video clip of the video event as a saved video segment when the screenshot command originates from activation of the video clip button of the remote control device, provide a screenshot sharing user interface for presentation on the display element concurrently with presentation of the video event on the display element, the screenshot sharing user interface provided in a distinct and separate window or area of the display element, the screenshot sharing user interface comprising an interactive control comprising a user activatable icon for a hosted online sharing application, wherein user selection of the icon initiates sharing of the saved screenshot or the saved video segment from the set-top box receiver by way of the hosted online sharing application, in response to user activation of the icon, launch a web browser application resident at the set-top box receiver and direct the web browser to an address corresponding to the hosted online sharing application, resulting in a transition from the screenshot sharing user interface provided on the display element to a window generated by the hosted online sharing application and provided on the display element, obtain, at the set-top box receiver, user instructions to manipulate and control functions of the hosted online sharing application to control the outputting of the saved screenshot or the saved video segment using the hosted online sharing application, and initiate outputting of the saved screenshot or the saved video segment from the set-top box receiver in association with the hosted online sharing application;

wherein presentation of the video event continues throughout the capturing of the currently displayed image or the video clip, the providing of the screenshot sharing user interface, and the outputting of the saved screenshot or the saved video segment.

* * * * *